United States Patent [19]

Lake et al.

[11] Patent Number: 4,764,339

[45] Date of Patent: Aug. 16, 1988

[54] HIGH FLUX REACTOR

[75] Inventors: James A. Lake; Russell L. Heath; John L. Liebenthal, all of Idaho Falls, Id.; Deslonde R. DeBoisblanc, Summit, N.J.; Carl F. Leyse, Idaho Falls; Kent Parsons, Idaho Falls; John M. Ryskamp, Idaho Falls; Robert P. Wadkins, Idaho Falls; Yale D. Harker, Idaho Falls; Gary N. Fillmore, Idaho Falls; Chang H. Oh, Idaho Falls, all of Id.

[73] Assignee: The United States of America as represented by the United States Department of Energy, Washington, D.C.

[21] Appl. No.: 942,102

[22] Filed: Dec. 16, 1986

[51] Int. Cl.[4] .................. G21C 23/00; G21C 15/00
[52] U.S. Cl. ..................... 376/353; 376/343; 376/340; 376/400; 376/455; 376/901
[58] Field of Search ............... 376/353, 346, 340–343, 376/399, 400, 421, 422, 901, 455

[56] References Cited

U.S. PATENT DOCUMENTS

| | | | |
|---|---|---|---|
| 3,120,471 | 2/1964 | Koutz et al. | 376/342 |
| 3,143,478 | 8/1964 | Chernick et al. | 376/346 |
| 3,149,044 | 9/1964 | DeBoisblanc et al. | 376/343 |
| 3,157,581 | 11/1964 | Jamerson | 376/422 |
| 3,246,697 | 4/1966 | Natland | 376/342 |
| 3,274,064 | 9/1966 | Leonard, Jr. | 376/343 |
| 3,276,963 | 10/1966 | Pearce et al. | 376/343 |
| 3,378,447 | 4/1968 | Mittelman | 376/341 |

FOREIGN PATENT DOCUMENTS

| | | | |
|---|---|---|---|
| 2116937 | 10/1972 | Fed. Rep. of Germany | 376/342 |
| 822629 | 10/1959 | United Kingdom | 376/901 |
| 1194913 | 6/1970 | United Kingdom | 376/342 |

OTHER PUBLICATIONS

Nuclear Reactors for Research, GER-1054, by Manson Benedict, Reprint from Chem. Eng. Progress, Feb. 1955, pp. 2–15.

4th Annual Conf. of Atomic Industrial Forum, Oct. 1957, Paper No. 57-AIF-34, by Gruber, pp. 1–6.

Primary Examiner—Harvey E. Behrend
Attorney, Agent, or Firm—Gustavo Siller; Paul A. Gottlieb; Judson R. Hightower

[57] ABSTRACT

A high flux reactor is comprised of a core which is divided into two symetric segments housed in a pressure vessel. The core segments include at least one radial fuel plate. The spacing between the plates functions as a coolant flow channel. The core segments are spaced axially apart such that a coolant mixing plenum is formed between them. A channel is provided such that a portion of the coolant bypasses the first core section and goes directly into the mixing plenum. The outlet coolant from the first core segment is mixed with the bypass coolant resulting in a lower inlet temperature to the lower core segment.

12 Claims, 2 Drawing Sheets

HIGH FLUX REACTOR

CONTRACTUAL ORIGIN OF THE INVENTION

The U.S. Government has rights to this invention under Contract No. DE-AC07-76ID01570 between EG&G Idaho, Inc. and the U.S. Department of Energy.

BACKGROUND OF THE INVENTION

This invention relates generally to a nuclear research reactor, and more particularly to an ultra high thermal neutron flux reactor.

High flux research reactors are presently used for a variety of research and testing purposes, including neutron beam research, isotope production, and materials testing. The current state of the art reactors produce flux levels of about $10^{15}$ n/cm²s. Production of these flux levels requires generation of core power densities of 2–3 MW/L. Table 1 lists the performance characteristics of current generation, high flux research and test reactors. These reactors include the High Flux Reactor at Institut Lane Langein (ILL) (Grenoble), the High Flux Beam Reactor at Brookhaven National Laboratory (BNL), the High Flux Isotope Reactor at Oak Ridge National Laboratory (ORNL) and the Advanced Test Reactor at Idaho National Engineering Laboratory (INEL).

TABLE I
Operating Characteristics of Research Reactors

| | HFR (ILL) | HFBR (BNL) | HFIR (ORNL) | ATR (INEL) |
|---|---|---|---|---|
| Power (MW) | 57 | 60 | 100 | 250 |
| Coolant | D₂O | D₂O | H₂O | H₂O |
| Reflector | D₂O | D₂O | Be | Be |
| Core volume (L) | 46 | 100 | 50.9 | 275 |
| Average power density (MW/L) | 1.14 | 0.60 | 1.96 | 0.92 |
| Peak power density (MW/L) | — | 2.1 | 3.1 | 3.5 |
| Peak surface heat flux (MW/m²) | 5.0 | 4.2 | 3.9 | 7.0 |
| Peak unperturbed thermal flux ($10^{15}$ n/(cm²s) | 1.5 | 1.05 | 1.3 | 0.85 |

There is currently an identified need within the research community for an advanced steady-state neutron source with a flux level ten times that of the existing sources. The key to meeting this identified need is the production of a thermal neutron flux of at least $10^{16}$ n/cm²s in an ex-core environment which is suitable for a large number of research instruments including hot neutron sources (high temperature graphite) and cold neutron sources (cryogenic sources to scatter neutrons to low energies), neutron beam and guide tubes, materials and irradiation testing, and isotope research. Production of high values of neutron flux requires high fission rate densities (and therefore, high power densities). To obtain an order of magnitude increase in neutron flux, approximately an order of magnitude is required in fission source (power) density compared with current generation high flux research reactors. Small incremental performance gains can be made by flattening the core power distribution with a combination of heavy water coolant and finer gradations in fuel loading, increasing the coolant flow and pressure, and making the core more compact, but these alone will not permit the core power density to be increased sufficiently to produce the desired $10^{16}$ n/cm²s flux. Small, compact core volumes are highly desirable to keep the total reactor power as low as possible. The required high core power density results in relatively high heat flux values which present a major challenge to cooling the core. Operation at ultra-high core power densities produces high hot-stripe coolant and fuel plate temperatures, which may exceed critical heat flux and flow instability safety limits. These conditions are a function of coolant mass flow rate, coolant and plate temperatures, surface heat flux conditions, coolant channel geometry and characteristics, and coolant pressure. Critical heat flux is a local cooling disruption that usually occurs at the point of highest heat flux. Flow instability is the process in which boiling in a thin channel produces a transient flow condition that can proceed to fuel plate burnout. Flow instability is linked to the coolant temperatures produced by a hot-stripe along the length of a coolant channel to which poorly mixed coolant flow is exposed. Further, high temperature core conditions lead to the buildup of a thermal-insulating aluminum oxide layer on the fuel plate, which ultimately could lead to the fuel exceeding its melting limits. Therefore in view of these limitations, attainment of the $10^{16}$ n/cm²s flux goal cannot be accomplished by a straightforward extrapolation of current technology.

An additional disadvantage to conventional high flux research reactors is that the neutron beam tubes must be orientated tangentially to the core. This tangential orientation is required to prevent exposing the field-of-view of the beam tubes to fast neutrons and gammas produced in the core. It is desirable to have direct radial beam access to the high flux environment. Direct radial beam orientation allows more beams to be packed around the core, and exposes less structural tube material to the high flux environment than tangential orientation. A partial split core arrangement is utilized in the National Bureau of Standards Reactor to help reduce fast neutron and gamma background in the beams.

Therefore, in view of the above, it is an object of the present invention to provide a nuclear reactor capable of producing an ultrahigh thermal neutron flux.

It is a further object of the present invention to provide a reactor capable of producing an ultrahigh thermal neutron flux intensity in an environment accessable to a large number of instruments.

It is another object of the present invention to provide a reactor capable of producing an ultrahigh neutron flux which is also capable having neutron beam lines radially orientated toward the reactor.

It is still another object of the present invention to provide an ultrahigh neutron flux reactor wherein the oxide formation on the fuel plates is held below the levels experienced in present reactors.

It is still a further object of the present invention to provide a nuclear reactor having high fission rate densities and high power densities while maintaining the total reactor power as low as possible.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

SUMMARY OF THE INVENTION

To achieve the foregoing and other objects and in accordance with the purposes of the present invention, as embodied and broadly described herein, the high flux reactor of this invention may comprise a core which is divided into two symetrical segments, with each of the segments being housed in a pressure vessel. Each of the core segments includes at least one radial fuel plate. The spacing between the plates forms a channel for the flow of a reactor coolant. The pressure vessel has a coolant inlet at one end and a coolant outlet at the other end. The core segments are spaced axially apart, in a fixed position, from each other such that a coolant mixture plenum is formed between them. Means are provided such that a portion of the coolant passes from the coolant inlet to the coolant mixing plenum without passing through the first core segment. The outlet coolant from the first core segment is mixed in the central mixing plenum with bypass coolant that has passed between the upper core segment and the reactor vessel. This mixes the hot-stripe outlet coolant and results in a lower inlet temperature to the lower core segment.

DETAILED DESCRIPTION OF THE INVENTION

Figure 1:
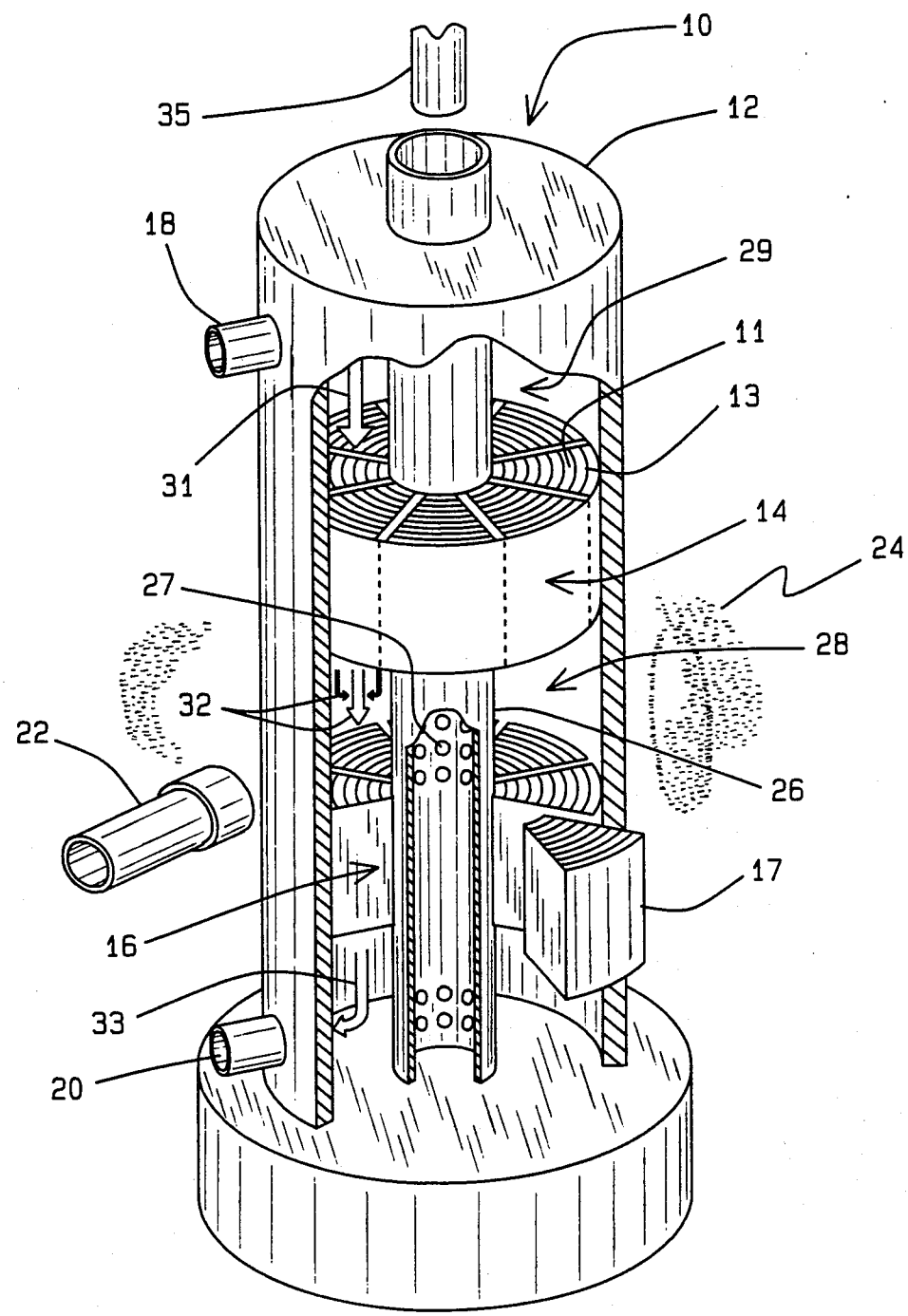
FIG. 1 is a pictorial view of the high flux reactor of the present invention.

Reference will now be made in detail to the present embodiments of the invention, an example of which is illustrated in the accompanying drawings. Referring to FIG. 1, reactor 10 is comprised of a core which consists of two symetric segments 14 and 16. These segments are housed within a pressure vessel 12. Each of the fuel elements 14 and 16 are comprised of concentric circumferential fuel plates 13. The reactor coolant enters the pressure vessel 12 through coolant inlet 18 and follows the flow indicated by arrow 31. Some of the coolant passes through core segment 14 through coolant channels 11, which are formed between the concentric fuel plates 13. A portion of the inlet coolant flow is diverted such that it does not pass through core segment 14. In a preferred embodiment, the coolant bypasses core segment 14 through a channel which is formed between the outermost circumferential fuel plate and the inner wall of pressure vessel 12. The outlet coolant from the first core segment 14 is mixed with the bypass flow in a coolant mixing plenum 28, which is formed between core segments 14 and 16. The coolant flow and mixing in plenum 28 is indicated by arrows 32. The coolant then flows through the coolant channels in core segment 16 and through the coolant outlet 20 as indicated by arrow 33. Preferably, core segments 14 and 16 are supported by core support column 26 which is integrally attached to the ends of pressure vessel 12. In a preferred arrangement, core support column 26 is hollow such that reactor control rods 35 may be inserted and retracted as needed. Fuel core segments 14 and 16 are designed with thin plates 13 and narrow coolant channels 11 to maximize the fuel plate surface area per unit core volume so that core cooling capacity is maximized for high core power densities.

The segmented core arrangement of reactor 10 has several advantages when compared to conventional high flux reactors. The coolant passing through the individual core segments is exposed to only a very short heated flow path so that the coolant temperature rise is relatively small. The outlet coolant from the first core segment 14 is mixed in the central mixing plenum 28 with bypass inlet coolant that has passed between upper core segment 14 and the inner wall of pressure vessel 12. This mixes the hot-stripe outlet coolant and results in a low inlet temperature to lower core segment 16. Thus, the critical value of the peak coolant outlet temperature can be kept relatively low in such a split core arrangement. Furthermore, turbulent heat transfer effects at the entrance to lower core segment 16 enhances cooling of the peak power density near the core midplane. The net result is that the split core configuration can operate at substantially lower peak coolant temperatures than its conventional counterparts, even at modest coolant flow rate and pressures. Additionally, the resultant increase in critical heat flux safety margin and the lower fuel plate temperature (and lower oxide build-up rate) allows for operation of the double core configuration at sufficiently high core power densities to attain the required $10^{16}$ n/cm$^2$s.

Core segments 14 and 16 may be comprised of a plurality of pie-shaped segments 17, to facilitate fabrication and accessability.

It will be readily apparent to those skilled in the art that other means may be used as a coolant bypass channel. In a preferred embodiment of the present invention, central core support column 26 will have aperatures 27 in the coolant mixing plenum region 28 and similar aperatures in coolant inlet region 29, thereby providing a means for bypassing first core segment 14.

Figure 2:
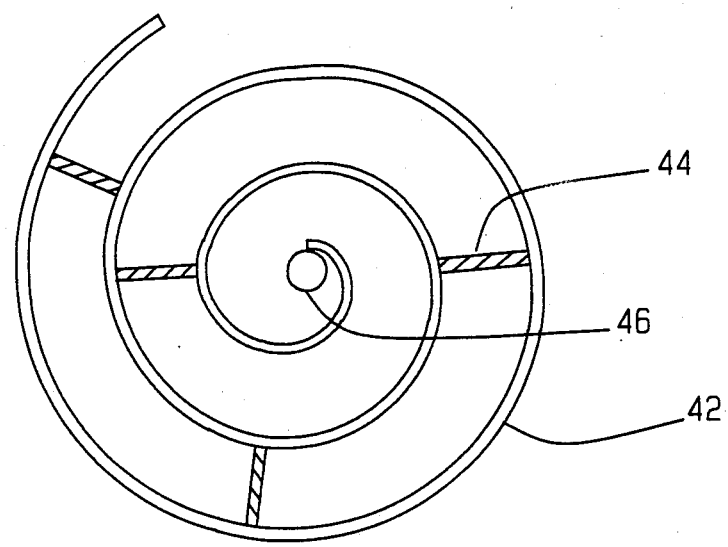
FIG. 2 is a top view of a core segment having an spirula plate design.

In other preferred arrangements in the present invention, core segments 14 and 16 are comprised of involute plates or spirula type rolled plates of fuel material as illustrated in FIG. 2. The plates 42 bend circumferentially around the core and are supported by a series of pads or pins 44. Spirula type plates 42 may be supported from pressure vessel 12 via support column 46, in an arrangement similar to the embodiment of FIG. 1.

For the goal flux levels of the present invention, a core power density of 10 MW/L is required. It is therefore important to minimize the critical reactor volume in order to minimize the total reactor power. Therefore, preferably the core fuel material is comprised of a high reactivity worth fuel material like fully enriched uranium or high density fuels like $U_3Si_2$ or $UAl_x$ (uranium-aluminum alloys).

Neutron beam access channels 22 are positioned outside of pressure vessel 12 in a pool of moderating material, represented by shaded area 24. The principal moderator of choice for the present invention is $D_2O$ because of its longer neutron diffusion length and lower parasitic neutron absorption cross section. The use of a moderator with this combination of parameters places the region of peak thermal neutron flux several centimeters from the core interface. The peak thermal neutron flux region thus covers a large volume while maintaining reduced fast-neutron and gamma-ray contamination compared with an equivalent $H_2O$-moderated reactor.

Since beam access channels 22 may be aimed at central mixing plenum region 28, the split core arrangement allows for direct radial beam access to the resulting high flux environment, in addition to tangential access, without exposing the direct field-of-view of the beam channels to significant high-energy-neutron and gamma contamination from the core.

The reactor is operated on a hard neutron energy spectrum (fissions occur in the fast energy group with little moderation inside the fuel segments) to enhance the neutron leakage into the radial reflector region 24, where the neutron leakage can be moderated and accessed by the experiments. There is some thermalization and peaking in plenum region 28 but because of the long neutron mean free path in $D_2O$, the core segments are neutronically tightly coupled. The major thermal neutron flux peaking occurs in a large (more than 100 liter) torodial ring surrounding the core in the radial reflector pool 24.

In the preferred arrangements of the present invention, pressure vessel 12 is placed directly adjacent to the core segments 14 and 16 for several reasons. First, it allows the heated core coolant to be isolated from the reflector pool 24, so that the beam tubes 22 and the hot and cold sources can be operated in a low temperature, low pressure environment. This low temperature, low pressure environment improves both safety and the experimental neutron economy. The experimental instruments can have thin windows and thin walls that are not part of the primary reactor coolant pressure boundary. Research instrument maintenance and modifications are also facilitated by the low temperature and low pressure environment. The reactor pressure vessel 12 itself is configured much like a small diameter pipe with flanges at both ends. This is a simpler, less expensive vessel to design and fabricate (in spite of the fact that the vessel lifetime is shorter because of the higher fast neutron fluence close to the core) than conventional reactor-pool pressure vessels with numerous beam tube penetrations. Second, the neutron energy spectrum directly adjacent to the core is quite hard (high energy), so that the pressure vessel is relatively transparent to the core leakage flux. Third, it places less material between the core and the experimental instruments because the beam tube does not have to be designed to withstand a high external pressure. For the above reasons, it is, therefore, advantageous to place the pressure boundary here rather than around the beam tubes and cold sources where it would result in a large parasitic loss of thermal neutrons and increased gamma background.

Typical design characteristics for an ultra-high flux reactor with two core segments are listed in Table II. Although the present invention has been described with reference to a reactor having two core segments, it will be readily apparent to those skilled in the art that the present invention may also comprise more core segments.

TABLE II

DESIGN CHARACTERISTICS OF AN ULTRAHIGH FLUX DOUBLE SEGMENT REACTOR

| | |
|---|---|
| Core Dimensions | |
| Fuel donut height (cm) | 13.7 |
| Fuel donut ID (cm) | 20.0 |
| Fuel donut OD cm) | 40.0 |
| Fuel donut thickness (cm) | 10.0 |
| Core volume (liters) | 25.8 |
| Central plenum height (cm) | 10.0 |
| $D_2O$ bypass gap (cm) | 2.0 |
| Zr gamma shield thickness (cm) | 0.5 |
| Zr pressure vessel thickness (cm) | 1.3 |
| Fuel | |
| Material | $U_3Si_2$/Al |
| Uranium enrichment (w/o U-235) | 93 |
| Volume fraction U in fuel seat | 0.45 |
| Volume fraction void in fuel meat | 0.1 |
| Maximum fuel density (g U/cc meat) | 4.8 |
| Fuel plate thickness (cm) | 0.102 |
| Coolant channel thickness (cm) | 0.076 |
| Fuel meat thickness (cm) | 0.051 |
| Cladding material | Aluminum-2219 |
| Cladding thickness (cm) | 0.025 |
| Number of fuel plates/assembly | 56 |
| Side plates material | Aluminum-2219 |
| Side plate thickness (cm) | 0.5 |
| Fuel burnup limit (fission/cc) | $2 \times 10^{21}$ |
| Physical Characteristics | |
| Reactor power (Mw) | 300 at BOC, 275 at EOC |
| Cycle length (days) | 14.0 |
| Core average power density (MW/L) | 11.6 at BOC |
| Power peaking factor (peak/average) | 1.6 at BOC |
| Peak power density (MW/l) | 18.5 at BOC |
| Peak reflector thermal neutron flux, $E < .683$ eV (n/(cm$^2$s)) | $1.0 \times 10^{11}$ |
| Gamma environment in region of peak neutron flux (W/g in $D_2O$) | 10 |
| Fast flux ($E > 1$ MeV) contamination in region of peak thermal flux (n/(cm$^2$s)) | $1.1 \times 10^{14}$ |
| Core fissile loading at BOC (kg U-235) | 22.2 |
| Number of unique fuel loading zones | 7 |
| Core burnable poison loading at BOC (g b$^{14}$) | 8.2 |
| Fuel burnup (kg U-235) | 5.6 |
| Thermal Hydraulic Conditions | |
| Coolant inlet pressure (MPa) | 4.2 |
| Core outlet pressure (MPa) | 3.4 |
| Pressure vessel design pressure (MPa) | 5.5 |
| Coolant flow rate (kg/s) | |
| in core channels | 602 |
| in bypass gap 820 | |
| Coolant velocity (m/s) | |
| in core channels | 16.0 |
| in bypass gap | 27.2 |
| Coolant inlet temperature (°C.) | 38 |
| Coolant outlet temperature (°C.) hot channel | 108 |
| Coolant T (°C.), hot channel | 70 |
| Peak surface heat flux (MW/m$^2$) | 17.3 |
| Hot spot fuel plate temperature, BOC/EOC (°C.) | 234/387 |
| Margin to CHF (std. dev.) | 3.3 |
| Margin to hydraulic instability (standard deviation) | 6.8 |
| Oxide thickness at EOC (mm) | 0.046 |
| Margin to fuel melting (°C.) | 262 |

The present invention thus provides a nuclear reactor capable of producing a neutron flux an order of magnitude larger than that produced by present day high flux reactors. Flow instability effects are alleviated in the present invention by the short flow channels and the hot-stripe mixing in the coolant plenum between the core sections. The core, which is comprised of thin circumferential fuel plates, produces a larger fuel plate surface area per unit core volume, shortened flow paths, and efficient hydraulic geometries. The life-limiting aluminum oxide layer formation on the fuel cladding, which insulates the plates and drastically increases fuel temperatures is not considered to be a key constraint of the split core concept. This results from the significantly lower peak operating temperatures acheivable with the short-flow-path and increased plate surface area of this invention. The present invention also enhances accessability to the high flux environment with radial beam tubes which are disposed in a low temperature, low pressure environment.

The foregoing description of the preferred embodiments of the invention have been presented for purposes of illustration and description. They are not intended to be exhaustive or to limit the invention to the precise form disclosed, and obviously many modifications and variations are possible in light of the above teachings. The embodiments were choosen and described in order to better explain the principle of the invention and its practicable applications to thereby enable others skilled in the art to best utilize the invention and various embodiments and with other modifications as are suited to the particular use contemplated. It is intended that the scope of the invention be defined by the claims appended hereto.

The embodiments of this invention in which an exclusive property or priviledge is claimed are defined as follows:

1. A high flux nuclear reactor comprising:
   (a) a pressure vessel including reactor coolant inlet means at the first end thereof and reactor coolant outlet means at the second end thereof;
   (b) a reactor coolant;
   (c) a first core segment housed within said pressure vessel, said first core segment including a plurality of concentric, circumferential fuel plates, the spacing between said concentric fuel plates forming coolant flow channels, each said fuel plate being thin relative to said spacing between said fuel plates;
   (d) means for stationarily supporting said first core segment from said pressure vessel;
   (e) a second core segment housed within said pressure vessel and spaced axialy apart from said first core segment such that a coolant mixing plenum is formed therebetween, said second core segment including a plurality of concentric, circumferential fuel plates, the spacing between said concentric fuel plates forming coolant flow channels, each said fuel plate being thin relative to said spacing between said fuel plates;
   (f) means for stationarily supporting said second core segment from said pressure vessel; and
   (g) first core coolant bypass means for channeling a volume of said coolant between said inlet means and said coolant mixing plenum such that said coolant volume bypasses said first core segment.

2. The reactor of claim 1 wherein said coolant is $D_2O$.

3. The reactor of claim 2 wherein said fuel plates are made of a fuel selected from the group consisting of fully enriched uranium, $U_3Si_2$ and alloys consisting of uranium and aluminum.

4. The reactor of claim 3 wherein said concentric circumferential fuel plates are divided into a plurality of substantially pie-shaped segments.

5. The reactor of claim 4 wherein said means for supporting said first and said second core segments comprises a support column attached to the center of each of said first and second core segments, the ends of said support column being in contact with said pressure vessel.

6. The reactor of claim 5 wherein said column is tubular and further comprising a reactor control rod, said control rod retractably inserted into the bore of said support column.

7. The reactor of claim 6 further comprising a $D_2O$ pool enclosing said pressure vessel.

8. The reactor of claim 7 further comprising neutron beam access tubes disposed in said pool, said tubes radially orientated toward said coolant mixing plenum.

9. The reactor of claim 1 wherein said coolant bypass means comprises a tube axially, attached to the center of said first core segment.

10. The reactor of claim 9 wherein said tube extends and is being in contact with the ends of said pressure vessel, said tube being axially attached to the center of said second core segment and said tube having an aperture between said coolant inlet and said first core segment and in said coolant mixing plenum whereby said tube further composes said means for supporting said first and said second core segments.

11. The reactor of claim 1 wherein each of said first and said second core segments includes an involute plate, the spacing between said involute plate forming coolant flow channels.

12. The reactor of claim 11 wherein said fuel plates are made of a fuel selected from the group consisting of fully enriched uranium, $U_3Si_2$ and alloys consisting of uranium and aluminum.

* * * * *